United States Patent
Simon

[15] 3,685,133
[45] Aug. 22, 1972

[54] METHOD OF CONNECTING A HOSE BETWEEN STATIONS

[72] Inventor: Theodore A. Simon, Houston, Tex.
[73] Assignee: Shell Oil Company, New York, N.Y.
[22] Filed: Nov. 4, 1970
[21] Appl. No.: 86,954

Related U.S. Application Data

[62] Division of Ser. No. 795,489, Jan. 31, 1969, Pat. No. 3,566,500.

[52] U.S. Cl. .......................29/427, 29/237, 137/15
[51] Int. Cl. .............................................B23p 19/02
[58] Field of Search .........29/157, 426, 237; 137/15; 61/72.3

[56] References Cited

UNITED STATES PATENTS

| | | | |
|---|---|---|---|
| 3,148,690 | 9/1964 | Petersen | 137/15 |
| 3,233,314 | 2/1966 | Watkins et al. | 29/237 |
| 3,431,739 | 3/1969 | Richardson et al. | 61/72.3 |

*Primary Examiner*—Charlie T. Moon
*Attorney*—Louis J. Bovasso and J. H. McCarthy

[57] ABSTRACT

A method of connecting a hose between a pair of stations wherein at least one of the stations is erratically movable with respect to the other and at least one of the stations has a pipe terminating in a pipe tee coupled thereto and the other of the stations is connected to the hose. A drawline is extended through the run of the pipe tee. One end of the drawline is connected to the free end of the hose and the drawline is pulled through the run of the pipe tee. The hose is connected to the adjacent end in a fluid-tight relationship and the drawline is disconnected from the hose. Finally, the drawline is removed from the pipe tee and the other end of the run of the pipe tee is closed whereby the pipe tee establishes fluid communication between the hose and the pipe.

5 Claims, 4 Drawing Figures

PATENTED AUG 22 1972 3,685,133

METHOD OF CONNECTING A HOSE BETWEEN STATIONS

CROSS-REFERENCE TO RELATED APPLICATIONS

This application is a division of a co-pending application of T. A. Simon Ser. No. 795,489, filed Jan. 31, 1969, now U.S. Pat. No. 3,566,500, entitled, "Method of Connecting a Hose between Stations".

BACKGROUND OF THE INVENTION

1. Field of the Invention

This invention relates to couplings; and, more particularly, to a method of connecting a hose between stations wherein one of the stations is erratically movable with respect to the other.

2. Description of the Prior Art

Various prior art methods and devices exist for coupling tubings to one another, including the connection of a flexible to a relatively stationary tubing. However, difficulties arise where flexible tubing is of large diameter, resulting in inadequate flexibility for ease of coupling to an erratically movable member. For example, it is often desired to connect oil or gas tankers to relatively large diameter, long, flexible gas or oil lines, as for example hoses 12 inches in nominal diameter and 600 feet in length. In such cases, these hoses are provided with blind flanges, complete with lifting lugs, the hoses being attached to marker or mooring buoys. After the tanker is moored to the buoy, the hoses are lifted to the deck of the tanker and connected to the tanker manifold one at a time. Such a procedure is conventional on most tankers inasmuch as most ship derricks cannot handle more than three tons in weight, which would be exceeded by lifting several fluid-filled hoses simultaneously.

Normal mooring connection time for each hose may be as much as 2 hours and 45 minutes and can exceed 4 hours in unfavorable conditions; disconnect time may be as much as 1 hour. Consequently, the total length of time, of course, would be determined by the number of hoses to be connected and/or disconnected.

A major difficulty encountered in such prior art mooring methods is that it is difficult to mate or line up satisfactorily the flange faces of the hose and the tanker manifold so as to bolt the flanges or engage the cam-locks of the hose clamping means. Of course, these difficulties are compounded by heavy, large diameter, relatively inflexible hoses, non-availability of a suitable mechanical device to draw flange faces tightly together for coupling, or rough seas, and other situations where one of the stations to be connected is erratically movable with respect to the other.

SUMMARY OF THE INVENTION

It is an object of this invention to provide an improved method of connecting a hose between stations wherein one of the stations is erratically movable with respect to the other.

It is a further object of this invention to provide a method of aligning large-diameter hose connections with the aid of a single winch line.

It is a still further object of this invention to provide a method of connecting an oil or gas hose to a tanker on the high seas in a relatively short length of time.

These and other objects are preferably carried out by providing a method of connecting a hose between a pair of stations wherein at least one of the stations is erratically movable with respect to the other and at least one of the stations has a pipe terminating in a pipe tee coupled thereto with the other station connected to the hose. A drawline is extended through the run of the pipe too. One end of the drawline is connected to the pipe too. One end of the drawline is connected to the free end of the hose and the drawline is pulled through the run of the pipe tee to thereby draw the hose into mating contact with the adjacent end of the pipe tee. The hose is connected to the adjacent end in fluid-tight relationship and the drawline is disconnected from the hose. Finally, the drawline is removed from the pipe tee and the other end of the pipe tee is closed whereby the pipe tee establishes fluid communication between the hose and the pipe.

DESCRIPTION OF THE PREFERRED EMBODIMENT

Figure 1:
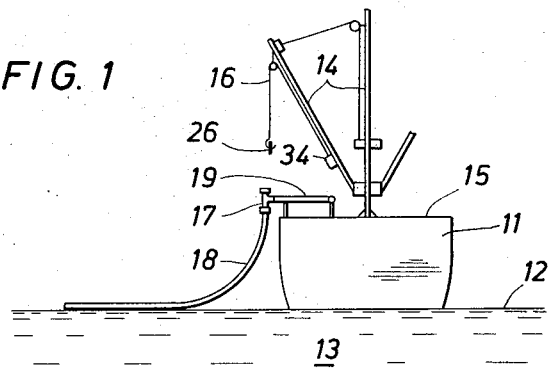
FIG. 1 is an elevational view of a tanker having a hose connected thereto.

Referring to FIG 1 a tanker 11 is shown resting on the surface 12 of a body of water 13. A derrick 14 is shown disposed on the deck 15 of tanker 11. A winch line 16, coupled to a winch 34, extends from derrick 14 directly above a conventional pipe tee 17. Pipe tee 17 is in turn coupled to both a hose 18 and a pipe or manifold 19 connected to tanker 11. Hose 18 maybe relatively long in length, may or may not be filled with liquids or gases, and may be equipped with suitable floats (not shown). HOse 18 may be coupled to a remote station such as a dock, quay, underwater gathering systems, and on or off shore pipelines or storage tanks (all not shown) as a well known in the art.

The pipe or manifold 19 may be coupled to storage tanks (not shown) on tanker 11. In this manner, oil or gas or any other fluids may be conveyed between tanker 11 and the station or stations coupled to hose 18.

It can be seen from the foregoing description of FIG. 1 that this arrangement is suitable for the purposes described. HOwever, on the high seas, whereby one or more of the stations, such as the tanker 11 and the station coupled to hose 18, are erratically movable with respect to the other, the problem of connecting a stiff oil transfer hose to a moored tanker becomes increasingly difficult, especially in rough weather. Drawing up and paralleling the flange faces of large diameter hose flanges to companion flanges is a difficult and time consuming task because of the problem of aligning the bolt holes and the inavailability of a suitable device for exerting the necessary force to mate the flange faces properly. Although the invention will be described hereinbelow with respect to connecting a hose to a tanker, the advantages are not necessarily restricted to use outboard of a ship's gunnel or quay edge, but are also applicable inboard at the ship's manifold or in any other (marine or land) situation where large-diameter hose connections can be made with the aid of a single winch line.

Figure 2:
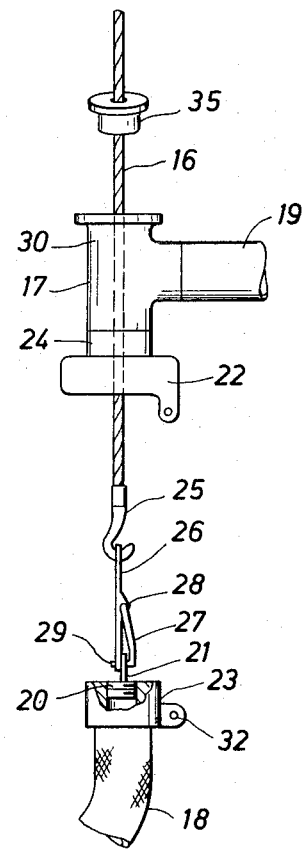
FIG. 2 is a partial elevational view showing the hose of FIG. 1 being pulled into position.

Referring now to FIG. 2, it can be seen that the free end of hose 18 is preferably provided with a threaded bull-plug 20 having a lifting lug 21 attached thereto. Although other methods are possible to connect the lifting lug, a bull-plug also serves to seal the hose end when not in use. A conventional hose coupling 22 surrounds the free end of hose 18. Coupling 22 is adapted to engage a like coupling 23 attached to the vertically-aligned adjacent arm end 24 welded to one end of the run of pipe tee 17. Couplings 22 and 23 may be any suitable couplings for readily joining together pipe sections. For example, couplings, as manufactured by the Thornhill-Craver Company of Houston, Tex., described on pages 4795 through 4801 of the 1968–1969 Composite Catalog of Oil Field Equipment and Services, published by World Oil, may be used. Bolted flanges may also be used, but at least one flange should be free to rotate for ease of bolt hole alignment.

The lowermost end of winch line 16 is provided with a hook 25 attached thereto. Hook 25 is coupled to a specially-designed connection hook 26 having a pivotally-mounted arm 27. Arm 27 is pivoted at 28 and adapted to extend through a mating hole 29 at the lower end of hook 26. Arm 27 may be resiliently biased, if desired. Obviously, other types of fastening means may be provided so that winch line 16 may be readily attached and detached from lug 21, the only requirements being that, first, such fastening means is of a size so as to be adapted to extend freely through the vertically-aligned arms or run of pipe tee 17 by passing into upper arm end 30 and out of lower arm end 24 as seen in FIG. 2 and, second, it be adequately designed to withstand torsion forces which will be exerted if connected to a threaded bull plug 20 during removal of same.

In operation, connector hook 26 is passed or lowered through the vertically-aligned arms or run of pipe tee 17 by passing it into the upper arm end 30 and out of the lower arm end 24. The hook 26 is attached to the lifting lug 21 of bull plug 20 by passing arm 27 through lug 21 and into hole 21 The line 16 is then lifted until coupling 22 comes into contact with coupling 23 on pipe tee 17. The hose is coupled to pipe tee 17 by joining the couplings 27 and 23 together, as for example by passing a bolt 31 (FIG. 2) of the couplings 22 and 23.

Figure 3:
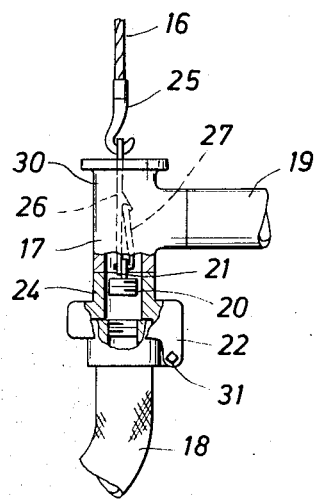
FIG. 3 is a partial elevational view showing the hose of FIG. 2 in position with the connecting means being removed therefrom.

Referring now to FIG. 3, connection hook 26 may be turned so that bull plug 20 is threaded out of engagement with the free end of hose 18. This may be accomplished by rotating hook 26, by means of a wrench or similar device, counter-clockwise to remove the bull plug 20.

Figure 4:
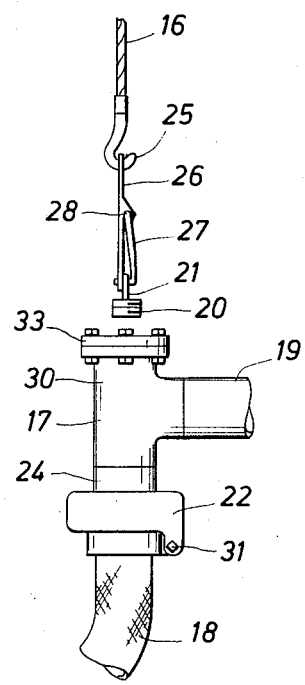
FIG. 4 is a partial elevational view of the completed hose connection of FIGS. 1 through 3.

Referring now the FIG. 4, bull plug 20 is pulled out of the arm of pipe tee 17 by lifting it free of arm ends 24 and 30. A blind cover or flange 33, as for example the blinds described in the aforementioned Composite Catalog, may be fastened to the open arm end 30 of pipe tee 17. In this manner, fluid-tight communication is completed between hose 18 and pipe manifold 19.

The hose bull plug 20 may then be removed from hook 25 and placed on the deck 15 of tanker 11. After the upper blind cover 33 is replaced and fastened, the connection is complete. Obviously, pipe tee 17 may be provided with such a blind cover 33 prior to carrying out the steps of FIGS. 2 through 4. In such a case, the blind cover must be first removed from the pipe tee. It may also be appropriate to provide a removable centering guide 35 (FIG. 2) through which the winch line 16 can slide to prevent internal damaging of tee 17 during operations.

It has been found that the method of my invention permits the coupling of hoses between stations wherein one of the stations is erratically movable with respect to the other, as for example in rough seas, in a relatively short length of time, as for example less than 20 minutes per hose as compared to several hours. This is a considerable savings in time over known prior art methods.

Of course, the foregoing steps may be reversed so as to disconnect the hose 18. Thus, blind flange 33 is removed from pipe tee 17 thus establishing fluid communication through the run of the tee 17. Bull plug 20 is re-installed onto the free end of hose 18 and winch line 16 is lowered through the run of tee 17 with bull plug 20 coupled to hook 26, as discussed hereinabove. Bolt 31 is removed and hose 18, attached to winch line 16, may be lowered away from mating contact with tee 17. Hook 27 is then driven out of hole 29 with a hammer (not shown) or similar means and hose 18 is dropped to the water 13. Of course, bull plug 20 may be merely installed on hose 18, bolt 31 removed and hose 18 dropped to the water 13 without the necessity of lowering winch line 16 and hook 26 as discussed hereinabove.

I claim as my invention:

1. A method of disconnecting a hose coupled to a pair of stations wherein at least one of the stations is erratically movable with respect to the other and at least one of said stations has a pipe terminating in a pipe tee coupled thereto with said hose coupled to one end of the run of said pipe tee in fluid-tight relationship and the other end of said run being closed, thereby establishing fluid communication between said hose and said pipe tee, said method comprising the steps of:

opening the other end of said run thereby establishing fluid communication through the run of said pipe tee;

extending a drawline through the run of said pipe tee;

connecting said drawline to the end of said hose coupled to said run;

disconnecting said hose from said one end of said run; and lowering said hose by lowering said drawline through said run thereby releasing said hose.

2. The method of claim 1 including the steps, prior to disconnecting said hose from said one end of said run, of:

extending a drawline through the run of said pipe tee;

connecting said drawline to the end of said hose coupled to said run; and lowering said hose by lowering said drawline through said run thereby releasing said hose.

3. The method of claim 1 including the steps of:

removing said drawline from said hose; and raising said drawline through and out of said run.

4. The method of claim 3 wherein the step of connecting said drawline to the end of said hose coupled to said run includes the steps of:
provingconnecting hook means at the free end of said drawline;
providing threaded bull plug means having a lifting lug attached thereto to the free end of said hose; and
joining said connecting hook means to the lifting lug of said bull plug means in retentive relationship.

5. The method of claim 4 wherein the step of removing said drawline from said hose includes the step of:
releasing said hook means from said lifting lug.

* * * * *